United States Patent [19]

Krietzman et al.

[11] Patent Number: 5,474,032
[45] Date of Patent: Dec. 12, 1995

[54] SUSPENDED FELINE TOY AND EXERCISER

[76] Inventors: Mark H. Krietzman; Yu-Hsin Chen, both of 25550 Hawthorne Blvd., Suite 101, Torrance, Calif. 90505

[21] Appl. No.: 406,427

[22] Filed: Mar. 20, 1995

[51] Int. Cl.$^6$ ................................................. A01K 15/02
[52] U.S. Cl. .......................................... 119/708; 273/26 E
[58] Field of Search .............................. 119/708, 702, 119/711, 707; 273/26 E, 58 C

[56] References Cited

U.S. PATENT DOCUMENTS

| | | | |
|---|---|---|---|
| 3,181,504 | 5/1965 | Stortz | 119/708 |
| 3,295,499 | 1/1967 | Manchester | 119/708 |
| 3,454,275 | 7/1969 | Pontone | 273/26 E |
| 3,731,925 | 5/1973 | Caldwell | 273/26 E |
| 3,731,926 | 5/1973 | Vincent | 273/26 E |
| 4,438,727 | 3/1984 | Thompson | 119/708 |
| 4,499,855 | 2/1985 | Galkiewicz | 119/708 |
| 4,517,922 | 5/1985 | Lind | 119/808 |
| 4,712,510 | 12/1987 | Tae-Ho | 119/708 |
| 5,246,226 | 9/1993 | McGuinn | 273/26 E |

*Primary Examiner*—Paul J. Hirsch
*Attorney, Agent, or Firm*—John E. Halamka

[57] ABSTRACT

A pet toy and excerises device adapted to be selectively mounted over the top of an existing dwelling door to allow the pet to interact with the device and "play by itself", or the device may be hand held to initiate excerise. The device comprises a plurality of wands, flexible or rigid, a tether and a target object. The device may further combine a counter-weight and a stop selectively mounted on the tether all of which increase the eccentricity of the orbit of the target object when the target is encountered by the pet.

12 Claims, 5 Drawing Sheets

SUSPENDED FELINE TOY AND EXERCISER

BACKGROUND OF THE INVENTION

1. Field of the Invention

This invention relates to suspended pet toys & exercise devices, more particularly, to an improved suspended cat toy which provides a durable, over the door, mounted wand to which a tethered target object is affixed. A toy exerciser of this type engages a cat to "play on its own," and provides valuable exercise for the cat, which can alleviate boredom and destructive behavior.

2. Description of the Prior Art

The history of suspended cat toys has generally involved solutions that require a human counterpart to hold and waive the wand. Other solutions which provide for mounts to suspend the toy provide inadequate mount strengths to withstand the constant battering of the target by the cat. Yet other solutions achieve strong supports but present safety problems by blocking a door or doorway.

A suspended pet toy such as that taught by U.S. Pat. No. 4,499,855, issued to Galkiewicz, illustrates a pet toy consisting of a wand, tether and target object. A human hand holds and moves the wand to engage the cat. An inherent limitation in this type of prior art is the need for someone to hold the wand.

Another suspended pet toy such as that taught by U.S. Pat. No. 4,712,510, issued to Tae Ho, discloses a telescoping flexible wand which mounts via suction cups and thereby eliminates the need for someone to hold the wand. However, suction cups become strained when the cat batters the target object and often disengages from the surface. Suction cups also require a smooth surface for adequate adhesion.

U.S. Pat. No. 4,438,727, issued to Thompson, teaches a suspended cat toy which is mounted in a doorway. This configuration eliminates the problem found in suction cups and considers the desirous benefits of a toy with an erratically moving target. However, this invention prevents closure of the door and obstructs passage through the doorway.

U.S. Pat. No. 5,216,978, issued to Lovell, discloses a rigid platform which attaches over an existing doorknob to which a tethered target can be attached. However, an over the doorknob mount has limitations which include obstruction to opening the door inward if the device is on the outer side. Also obstructed, by the rigid mount, is the area in front of the doorknob.

U.S. Pat. No. Des. 279,450, issued to Chap, discloses an ornamental design for an over the door hanger bracket and hook.

None of the solutions provide a durable over the door, mounting system for suspending a toy or exercise device. None of the solutions provide an over the door mounted suspended cat toy which does not impair opening or closure of the door, or block passage through the doorway.

SUMMARY OF INVENTION

Accordingly, it is an object of the present invention to provide an improved toy and exercise device for exercising and amusing pet animals such as cats.

It is yet another object of the invention to provide a durable inexpensive over the door mounted flexible wand system for suspending a target object from an existing door.

It is yet another object of the invention to provide a durable inexpensive over the door mounted flexible wand system for suspending a target object from an existing door in which the wand can be removed for separate play and amusement. This separate play teaches the cat how to interact with the target object.

It is yet another object of the invention to provide a durable over the door mounted rigid wand for suspending a target object from an existing door.

It is yet another object of the invention to provide a durable over the door mount with multiple removable wands for suspending multiple target objects from an existing door.

It is yet another object of the invention to provide an amusement and exercise device which by virtue of its long tether, has increased erratic movement, and increased momentum, of the target object which keeps the cat's attention as it plays and batters the target object.

It is yet another object of the invention to provide an amusement and exercise device which by virtue of its reactive tether has increased erratic movements which keeps the cat's attention as it plays and batters the target object.

It is yet another object of this invention to provide a simple durable method for suspending multiple wand and multiple target objects from an existing door.

The features of the invention believed to be novel are set forth with particularity in the appended claim. The invention itself, however, both as to configuration, and method of operation, and the advantages thereof, may be best understood by reference to the following descriptions taken in conjunction with the accompanying drawings.

DETAILED DESCRIPTION OF THE PREFERRED EMBODIMENTS

Figure 1:
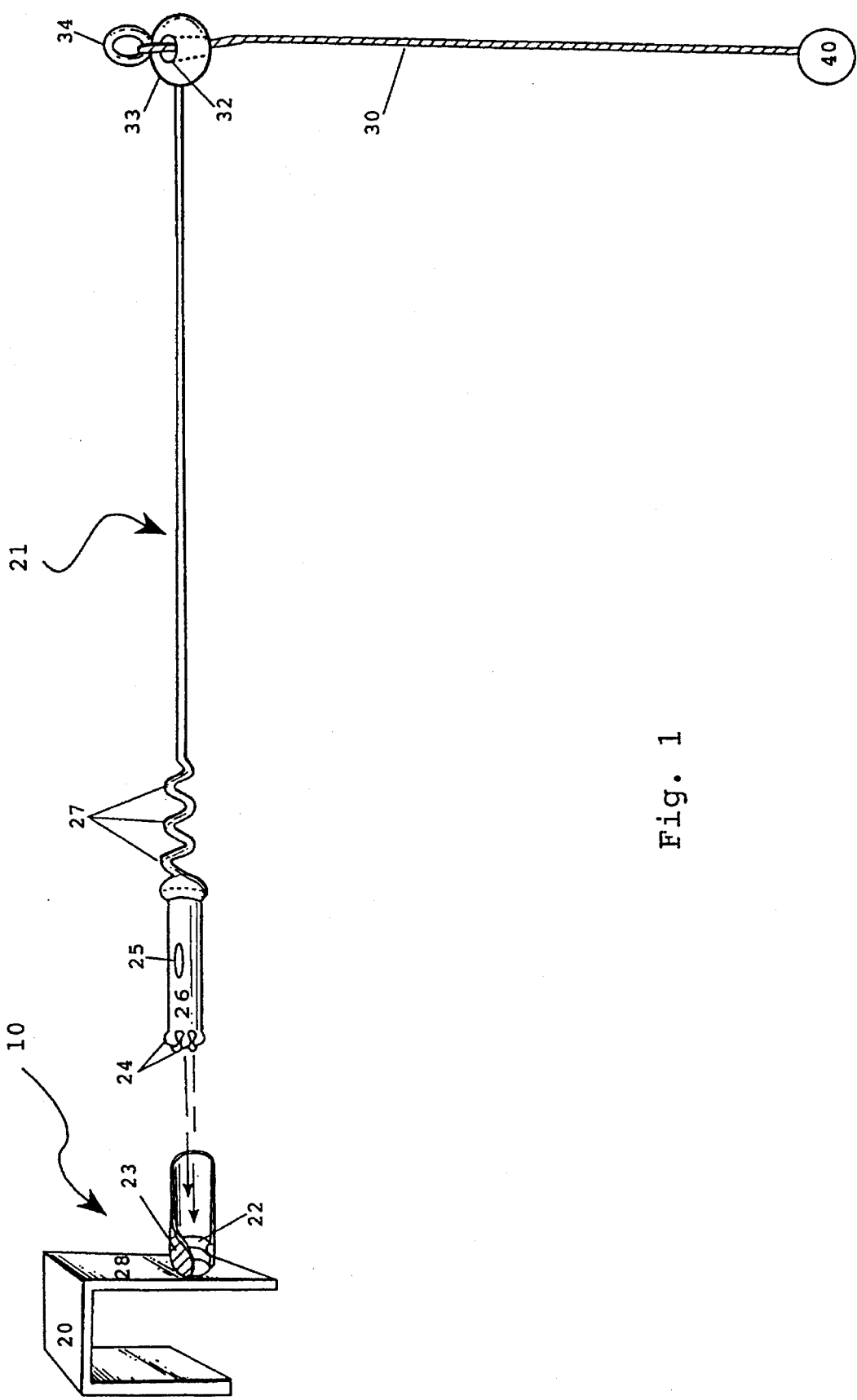
FIG. 1 illustrates a component view of the over the door pet toy and exerciser.

Referring now to the drawings, there is illustrated in FIG. 1 a component view of a horizontal side view of the preferred embodiment according to the over the door pet toy and exerciser generally designated 10.

The mounting potion of the device 10, consists of an upside down "U" shaped bracket 20 to which a flexible attenuated wand 21 may be attached and removed therefrom.

A sheath 23, which is molded as part of the front face of the mounting bracket 28, having a generally tubular shape is formed to accept the insertion of the handle 26 of the wand 21. Inside the sheath 23 a raised circular catch 22 is formed thereby providing a ridge to hold the wand 21 in place.

The posterior end 24 of the wand 21 is fabricated with a plurality of finger like projections of material having a memory and of a circumference greater than the diameter of the raised circular ridge 22 thereby forming a latch on the posterior end 24 of the wand 21 which may be removably insertable into the catch formed by ridge 22 thereby holding the wand 21 generally perpendicular to the door over which the bracket 20 is mounted.

Adjacent to the handle 26 a section of the wand is formed as a spring consisting of alternating, up and down, curved sections 27. By varying the spacing, number and thickness of the curved sections 27 the stiffness or flexibility of the wand 21 can be adjusted.

The end of the wand 21 remote from the handle 26 forms a bulb 33 having a channel 32 formed to allow a non-elastic tether 30 to be threaded through. One end of the tether 30 is secured by tying it to a weighted ring 34 of a size greater than the diameter of the channel 32 and a weight slightly less than the target object 40. The other end of the tether 30 is attached to a target object 40 so that the tether slides freely through the channel 32. Not shown in the drawings is the placement of the weighted ring 34 in the pocket 25, located on the handle 26, to effectively shorten the tether 30.

Figure 2:
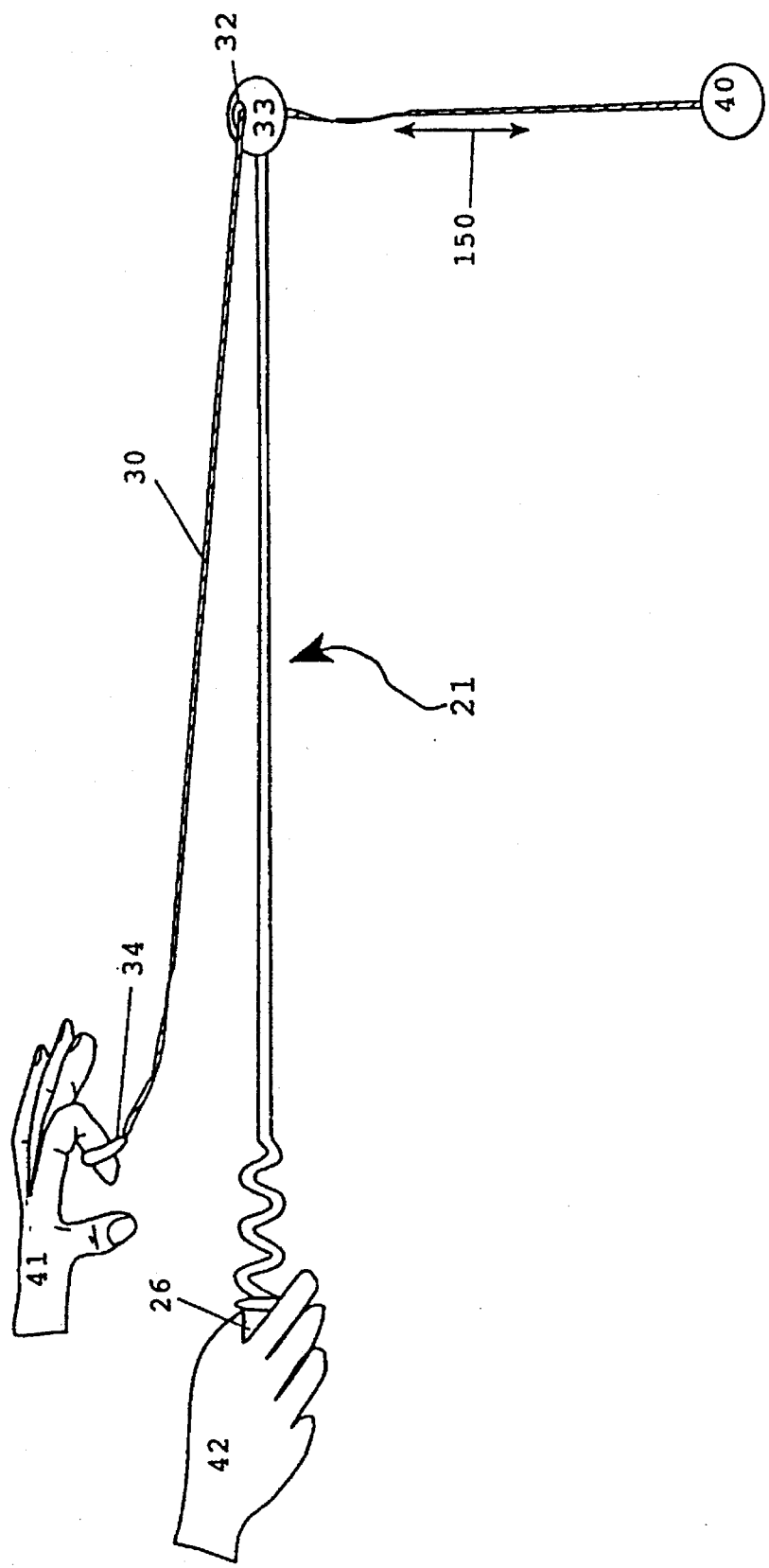
FIG. 2 illustrates a side view of the wand, shown in FIG. 1, being use independently of the over the door mount.

Referring now to FIG. 2, there is illustrated a side view of the wand 21, being used separately, from mount 20 shown in FIG. 1, to taunt the cat.

With one hand 42 the user may grasp the wand 21 around the handle 26, with the other hand 41 the user may grasp and pull back and forth on the ring 34 which causes the tether 30 to slide back and forth through the channel 32, in the bulb 33, at the free end of the wand 21. The moving tether 30 causes the target object 40 to bounce up and down in the general direction of arrow 150. Not shown in the drawing is the cat, taunted by the bouncing target object 40, attacking the target object 40. A pocket 25 may be formed in the handle 26 to hold the ring 34 thereby shortening the tether 30 for hand held use.

Figure 3:
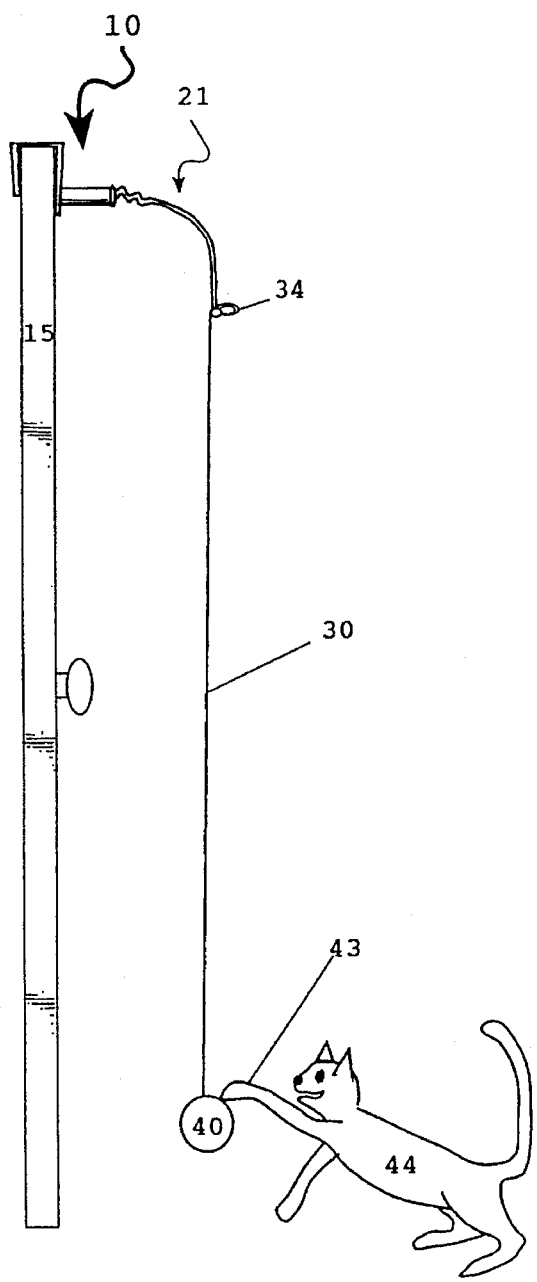
FIG. 3 illustrates a side view of the over the door pet toy and exerciser in FIG. 1, engaged by a cat.

Referring now to FIG. 3, there is illustrated a side view of the present invention, in the preferred embodiment 10 shown mounted over the top of a door 15 and engaged by a cat 44.

In response to the attack by the cat 44 which uses it's paw 43 to pull at the target object 40 the tether 30, which is affixed to the wand by being tied onto the weighted ring 34, applies pressure against the distal end of the wand 21 which bends downward in a reciprocal response to the pressure being applied.

Figure 4:
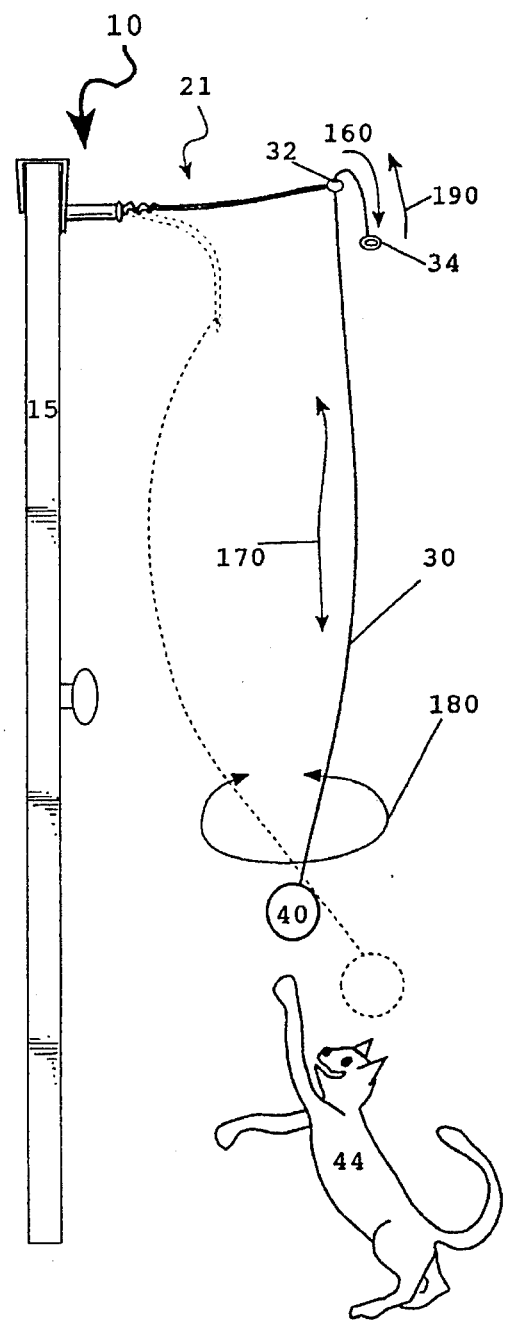
FIG. 4 illustrates a side view of the over the door pet toy and exerciser, in motion after being released by a cat.

Referring now to FIG. 4, there is illustrated the same view as FIG. 3, shown after the cat 44 releases the target object 40. The flexible wand 21 straightens out when the cat 44 releases the previously engaged target object 40. The tether 30 is pulled along the general direction of arrow 170 producing a bouncing of the target object 40.

The reciprocal upward motion of the wand 21 both places the target object 40 into rotational motion along the direction of arrow 180, and throws the weighted ring 34 up and over the bulb 33 generally in the direction of arrow 160.

After the initial reciprocal response the target object 40 is placed in a complicated motion both along the direction of arrows 170 and slowly moving downward as the slightly greater weight of the target object 40 pulls the tether 30 attached to the weighted ring 34 in the direction of arrow 190 while simultaneously rotating along the direction of arrow 180; this complicated motion can induce the cat to play "by itself" for a prolonged period.

Figure 5:
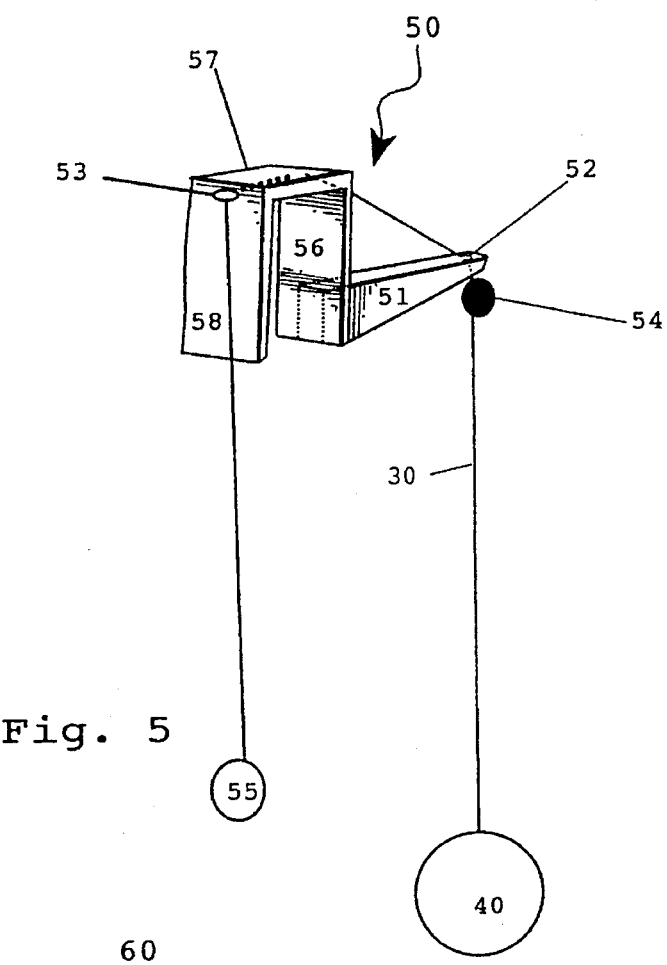
FIG. 5 illustrates a rear perspective view of an alternative embodiment of the over the door pet toy and exerciser.

Referring now to FIG. 5, there is illustrated another embodiment of the over the door pet toy and exerciser generally designated 50 at rest. This embodiment 50 consists of a molded over the door upside down "U" shaped bracket comprised of three sections, a front face 56, a top leg 57 and a back leg 58 with a rigid horizontal wand 51 protruding from the front face 56. At the distal end of the wand 51 a channel 54 is formed to allow a non-elastic tether 30 to be threaded through. A transverse channel 53 is formed through the top leg 57. The nonelastic tether 30, upon being threaded through the channel 52 in the wand 51 can be threaded through the transverse channel 53.

One free end of the tether 30, once threaded through the wand 51 and the top leg 57, is attached to a counterweight 55. The other free end of the tether 30 is attached to a target object 40.

Affixed to the tether 30 between the target object 40 and the wand 51 is a spherical stop 54 of a circumference greater than the inside diameter of the channel 52. The counterweight 55 is of a weight greater than that of the target object 40 and the stop 54 combined, thereby causing the stop 54 to rest against the bottom of the wand 51 until displaced by downward pressure applied to the target object 40. Not shown is the cat attacking, and applying downward pressure on, the target object 40, and the reciprocal action of the counterweight 56.

Figure 6:
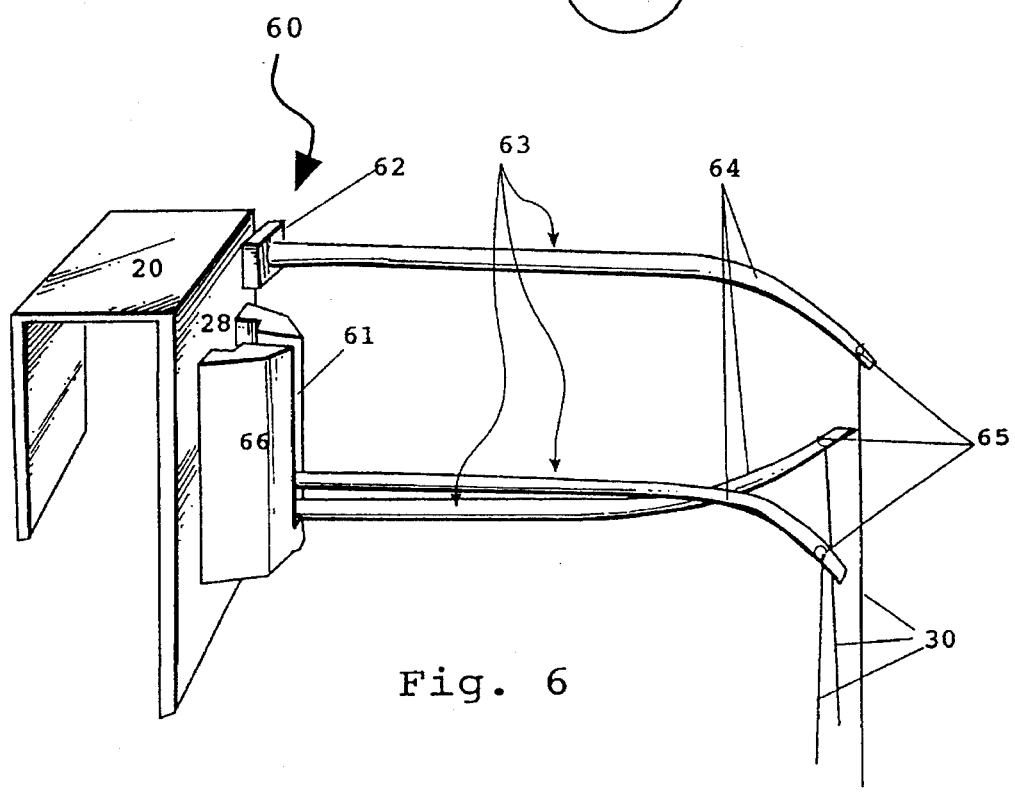
FIG. 6 illustrates a perspective view of an alternative embodiment of the over the door pet toy and exerciser with multiple slide in, removable, wands.

Referring now to FIG. 6, there is illustrated yet another embodiment of the over the door pet toy and exerciser generally designated 60 consisting of a similar the same upside down "U" shaped mounting bracket 20 of FIG. 1, with a "T" shaped guide 66, containing a vertical guide channel 61, affixed to the front face of the bracket 28 into which removable wands 63 can be inserted.

Each removable flexible wand is skewed at its distal end 64 causing the wand 63 to be it to be asymmetrical. At the posterior end of each wand is a square base plate 62 of sufficient size to act as a key for both affixing the wands into the guide channel 61, and positioning the wand's distal end 64. The distal end 64 is positioned by rotating the base plate 62 in 90 degree increments thereby altering the direction the skewed distal end 64 is directed.

Multiple tethers 30, and target objects (not shown), are attached to each of the multiple wands, through channels formed at the distal ends 64 of each wand.

Figure 7:
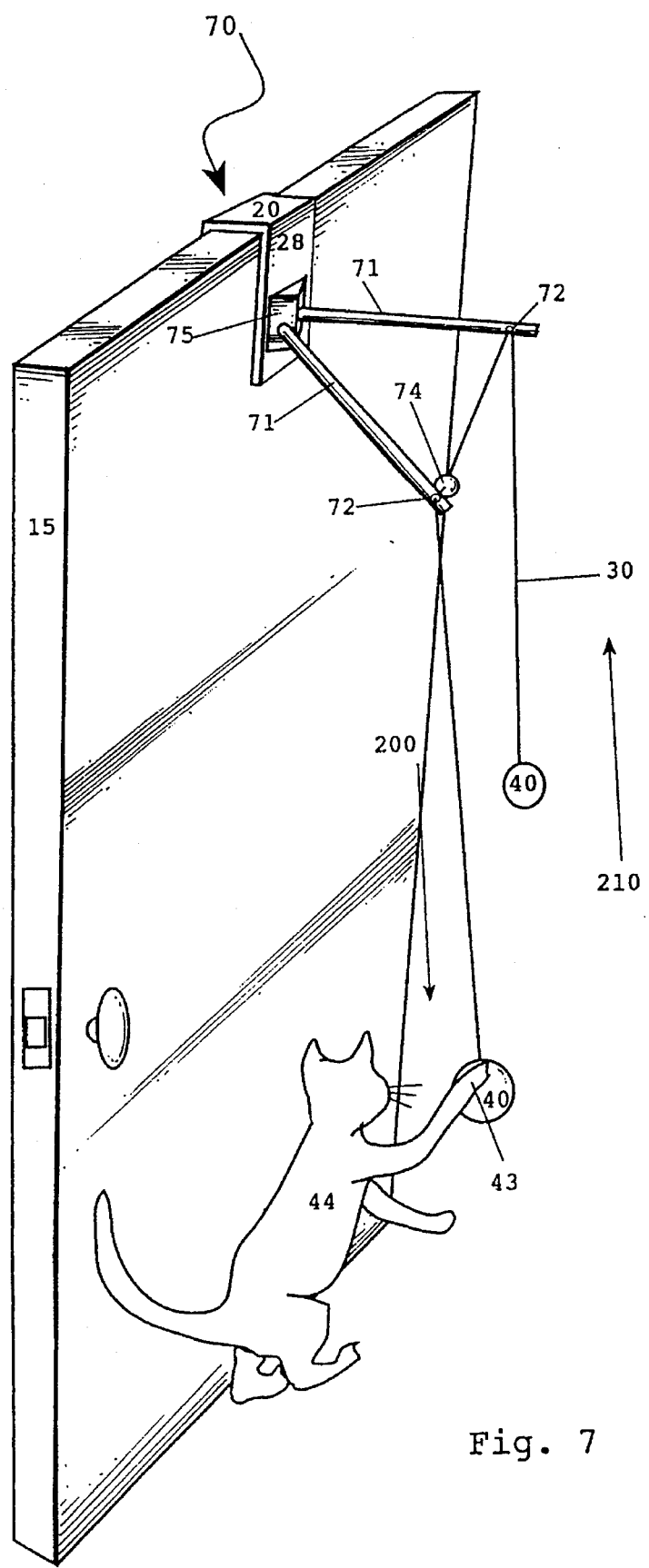
FIG. 7 illustrates a perspective view of an alternative embodiment of the over the door pet toy and exerciser, with multiple wand and multiple target objects, engaged by a cat.

Referring now to FIG. 7, there is illustrated yet another embodiment of the over the door pet toy and exerciser generally designated 70 with dual wands 71 and dual target objects 40 shown mounted over the top of a door 15 engaged by a cat 44.

This embodiment consisting of a similar upside down "U" shaped mounting bracket 20 of FIG. 1, with a triangular mounting plate 78 affixed to the front face 28 of the mounting bracket 20.

Multiple flexible wands 71 may be affixed to the triangular face 78 by means of a threaded posterior end on the wands 71 (not shown), which mount in a threaded aperture, (not shown), in the triangular face 78. The triangular face 78 directs the distal ends of the wands 71 apart. On the distal end of each wand a channel 72 is formed to allow a non-elastic tether 30 to be threaded through.

A target object 40 is affixed at the each end of the tether 30. A centering stop 74 is affixed at the tether's midpoint and between the two wands 71 which restricts the movement of the two target objects 40.

When the cat 44 uses it's paw 43 to pull on the target 200. object 40 the tether 30 moves along the line of arrow The target object 40 which is not pulled by the cat 44 moves upward along the line of arrow 210 in a reciprocal response to the first target object being pulled downward by the cat's paw 43 thereby further taunting an amusing the cat. Not shown in the drawing is the reciprocal response of the wands 71 and the accompanying bouncing and spinning of both the target objects 40, when the cat 44 releases the target object 40 it is pulling at with it's paw 43.

Since certain changes may be made in the above apparatus without departing from the scope of the invention herein involved, it is intended that all matter contained in the above description, as shown in the accompanying drawing, shall be interpreted in an illustrative, and not a limiting sense.

What is claimed is:

1. A pet toy and exercise device for use over the top of an existing dwelling door: said pet toy and exerciser device comprising in combination:
   a mounting bracket formed with legs in an upside down "U" shape of preselected width to fit snugly over the top edge of said existing door and not interfere with the operation of the door;
   a flexible wand having an elongated central axis, a first end mounted on one of said legs and a second end;
   a wall forming a small channel through said second end of said flexible wand;
   a tether fabricated of a substantially non-elastic length of cord having one end secured through said channel; and,
   a target object attached to said tether remote from said channel, said target object being of a size, material and weight suitable for batting and clawing by a pet so that under the condition of said target object being engaged by the pet, said target object, action through said tether, will cause said flexible wand to bend in the direction transverse to its elongated axis and under the condition of said target object being released by the pet, said flexible wand will springedly return to an unflexed position causing said target object to traverse an erratic orbit.

2. The pet toy and exerciser device defined in claim 1 wherein said device further comprises;
   a bulb formed at said second end of said flexible wand, said wall forming said small channel through said bulb; and,
   a weighted ring, of a size greater than the diameter of said small channel whereby the user may secure said tether by threading said one end of said tether through said small channel and attaching said one end to said weighted ring allowing freedom of movement of said tether through said small channel thereby increasing the eccentricity of said erratic orbit of said target object.

3. The pet toy exerciser device defined in claim 1 wherein said device further comprises;
   a plurality of said flexible wands each having an elongated central axis, a first end mounted on one of said legs and a second end;
   a plurality of said tethers; and
   a plurality of said target objects whereby the pet is presented with multiple target objects which interact during the transversing of said erratic orbit.

4. The pet toy and exerciser device defined in claim 1 wherein said device further comprises;
   a pair of said flexible wands, mounted so that the distance between said second ends is far greater than the distance between said first ends
   a single tether threaded through said small channels;
   a stop, of a diameter greater than the size of said small channels affixed to the tether between both of said wands; and,
   a pair of said target objects whereby the pet is presented with dual target objects which move both dependently upon the pets movement of one of said target objects, and independently during the transversing of said erratic orbits.

5. The pet toy and exerciser device defined in claim 1 wherein said device comprises;
   a spring formed in said wand between said first and seconds ends of alternating, up and down, curved sections of a number and spacing to controllably add flexibility to said wand.

6. A pet toy and exerciser device for use over the top of an existing dwelling door: said pet toy and exerciser device comprising in combination:
   a mounting bracket formed with legs in an upside down "U" shape of preselected width to fit snugly over the top edge of said existing door and not interfere with the operation of the door;
   a rigid wand having an elongated central axis, a first end mounted on one of said legs and a second end;
   a first wall forming a guide channel through said second end of said rigid wand;
   a second wall forming a transverse channel; through the top of said "U" shaped mounting bracket;
   a tether fabricated of a substantially non-elastic length of cord having one end threaded through said transverse channel in said bracket;
   a counter-weight mounted on said end of said tether remote from said transverse channel;
   a target object mounted on the end of the tether remote from said counter-weight, said target object being of a size, material and weight suitable for batting and clawing by a pet so that under the condition of said target object being released by the pet, said counter-weight will move said target object away from the pet and generally upward until said stop engages said rigid wand thereby causing said target to transverse and erratic orbit.

7. A pet toy and exerciser device for use over the top of an existing dwelling door: said pet toy and exerciser device comprising in combination:
   a mounting bracket formed with legs in an upside down "U" shape of preselected width to fit snugly over the top edge of said existing door and not interfere with the operation of the door;
   a key guide bracket mounted on one of said legs;
   a flexible wand having an elongated central axis, a first end fabricated in the shape of a key removably insertable into said key guide bracket and a second end;
   a wall forming a small channel through said second end of said flexible wand;
   a tether fabricated of a substantially non-elastic length of cord having one end secured through said small channel; and,
   a target object attached to said tether remote from said channel, said target object being of a size, material and weight suitable for batting and clawing by a pet so that under the condition of said target object being engaged by the pet, said target object, action through said tether, will cause said flexible wand to bend in the direction transverse to its elongated axis and under the condition of said target object being released by the pet, said flexible wand will springedly return to an unflexed position causing said target object to traverse an erratic orbit.

8. The pet toy and exerciser device defined in claim 7 wherein said device further comprises;
- a bulb formed at said second end of said flexible wand, said wall forming said small channel through said bulb; and,
- a weighted ring, of a size greater than the diameter of said small channel whereby the user may secure said tether by threading said one end of said tether through said small channel and attaching said one end to said weighted ring allowing freedom of movement of said tether through said small channel thereby increasing the eccentricity of said erratic orbit of said target object.

9. The pet toy and exerciser device defined in claim 7 wherein said device further comprises;
- a plurality of said flexible wands each having an elongated central axis which is skewed, each first end fabricated in the shape of a key removably insertable into said key guide bracket and each second end having a wall forming said small channel;
- a plurality of said tethers; and
- a plurality of said target objects whereby the pet is presented with multiple target objects which interact during the transversing of said erratic orbit.

10. A pet toy and exerciser device for use over the top of an existing dwelling door: said pet toy and exerciser device comprising in combination:
- a mounting bracket formed with legs in an upside down "U" shape of preselected width to fit snugly over the top edge of said existing door and not interfere with the operation of the door;
- a sheath formed as part of one of said legs, said sheath having preselected internal diameter, a selected section of which is smaller to form a catch;
- a flexible wand having an elongated central axis, a first end being formed with a flexible cup end having a plurality of deformable finger like projections, said end cup having a circumference that is larger than the inside diameter of said sheath and upon the condition of being pushed past said catch is removably latched in place, and a second end;
- a wall forming a small channel through said second end of said flexible wand;
- a tether fabricated of a substantially non-elastic length of cord having one end secured through said small channel; and,
- a target object attached to said tether remote from said channel, said target object being of a size, material and weight suitable for batting and clawing by a pet so that under the condition of said target object being engaged by the pet, said target object, action through said tether, will cause said flexible wand to bend in the direction transverse to its elongated axis and under the condition of said target object being released by the pet, said flexible wand will springedly return to an unflexed position causing said target object to traverse an erratic orbit.

11. The pet toy and exerciser device defined in claim 10 wherein said device comprises;
- a threaded channel formed as part of one of said legs, said threaded channel having a preselected internal diameter;
- a flexible wand with said first end of said preselected diameter and threaded to mount into said threaded channel.

12. The pet toy and exerciser device defined in claim 10 wherein said device comprises;
- a pocket formed in said wand between said first end and said second end, wherein said weighted ring can be removable inserted to effectively shorten said tether for use of said wand free from said mounting bracket.

* * * * *